United States Patent [19]

Yeh

[11] Patent Number: 4,856,056
[45] Date of Patent: * Aug. 8, 1989

[54] APPARATUS FOR TIMELY CONTROLLING THE SOUND CHARACTERISTIC OF A SIGNALING MEANS OF A VOICE COMMUNICATION DEVICE

[75] Inventor: Kou-I Yeh, Taipei, Taiwan

[73] Assignee: Inventa Electronics Co., Ltd., Taipei, Taiwan

[*] Notice: The portion of the term of this patent subsequent to Feb. 17, 2004 has been disclaimed.

[21] Appl. No.: 65,204

[22] Filed: Jun. 18, 1987

Related U.S. Application Data

[63] Continuation-in-part of Ser. No. 690,720, Jan. 10, 1985, Pat. No. 4,644,106.

[51] Int. Cl.$^4$ ............................................. H04M 1/21
[52] U.S. Cl. ..................................... 379/375; 379/387
[58] Field of Search ................ 379/372, 373, 374, 375, 379/376; 340/329, 328, 348 E, 309.15, 309.4; 455/231, 181; 331/182, 183

[56] References Cited

U.S. PATENT DOCUMENTS

| | | | |
|---|---|---|---|
| 3,885,171 | 5/1975 | Hirono | 307/252 A |
| 4,409,439 | 10/1983 | Gamble | 379/375 X |
| 4,480,154 | 10/1984 | Klee | 379/373 |
| 4,644,106 | 2/1987 | Yeh | 379/375 |

Primary Examiner—Jin F. Ng
Assistant Examiner—Randall Vaas
Attorney, Agent, or Firm—Townsend and Townsend

[57] ABSTRACT

An apparatus is provided for programmably silencing a telephone ringer for one or more predetermined periods of time on a daily basis. In accordance with the time set by a user, the apparatus places the telephone ringer under the control of the data stored in the read only memory and the random access memory of the central processing unit, whereby the ringer can be automatically set at predetermined sounding condition.

4 Claims, 6 Drawing Sheets

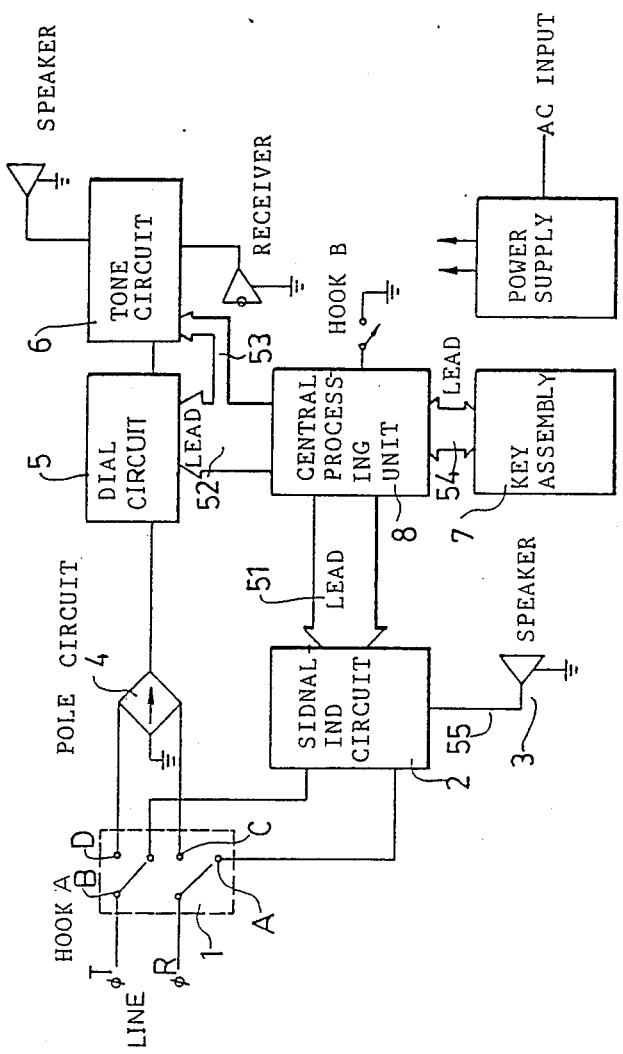
F I G. 1

| TIME SETTING | PM/AM | HOUR | MINUTE | VOLUME CONDITION |
|---|---|---|---|---|
| STANDARD TIME SETTING | 1 | 03 | 15 | |
| THE FIRST PREDETERMINED TIME SETTING | 0 | 06 | 30 | 0 |
| THE SECOND PREDETERMINED TIME SETTING | 1 | 11 | 00 | 1 |
| THE THIRD PREDETERMINED TIME SETTING | — | — | — | — |
| THE FORTH PREDETERMINED TIME SETTING | — | — | — | — |
| | ONE DIGIT | TWO DIGITS | TWO DIGITS | TWO DIGITS |

FIG. 4A

| TIME SETTING | PM/AM | HOUR | MINUTE | VOLUME CONDITON |
|---|---|---|---|---|
| STANDARD TIME SETTING | 1 | 03 | 15 | |
| THE FIRST PREDETERMINED TIME SETTING | 0 | 12 | 00 | 00 |
| THE SECOND PREDETERMINED TIME SETTING | 0 | 06 | 30 | 01 |
| THE THIRD PREDETERMINED TIME SETTING | 1 | 08 | 00 | 10 |
| THE FORTH PREDETERMINED TIME SETTING | 1 | 11 | 00 | 11 |

APPARATUS FOR TIMELY CONTROLLING THE SOUND CHARACTERISTIC OF A SIGNALING MEANS OF A VOICE COMMUNICATION DEVICE

This application is related to application Ser. No. 690,720 filed Jan. 10, 1985 now U.S. Pat. No. 4,644,106.

BACKGROUND OF THE INVENTION

This invention relates to an apparatus for timely controlling the sound characteristic of a signaling means of a voice communication device, and more particularly to a circuitry of controller by which sounding volume of the signaling means can be optionally controlled.

It can be appreciated that at certain times of the day it is inconvenient and troublesome to answer telephone calls whether at home or at the office. Some people have devised home remedies to eliminate the signaling so as to avoid the disturbance caused by an unwanted telephone call. For example, they have placed the telephone where they could not hear it, set the ringer at its lowest possible volume, or have simply taken the receiver off the hook. The telephone company has been provided an option whereby the telephone can be set at the lowest ringer volume at the time of installation so that the ringing sound is essentially inaudible and may as well be turned off completely.

A major drawback with each of these remedies is that it is always necessary for the user to remember to employ the remedy for silencing the telephone and then remember to reactivate the ringer when incoming calls are desired. None of the above methods perform either the on or off function automatically. As a result, people either forget to turn the ringer off and thus receive calls at undesirable times or forget to turn the ringer back on and thus miss calls which they are willing to receive.

SUMMARY OF THE INVENTION

It is, therefore, the main object of the present invention to provide an apparatus which can be programmed by the user for selectively setting the periods of time during which a telephone ringer should be activated or silenced.

Another object of the present invention is to provide an apparatus which depends upon the time selectively set by the user which outputs the ring in accordance with the volume which is programmably controlled by the data stored in the read only memory (ROM) and random access memory (RAM) of the central processing unit (CPU).

The main feature of the present invention is that the ringer's volume condition is controlled by the selected time entered into the data stored in the ROM and the RAM of the CPU.

Another feature of the present invention is that the apparatus includes means for controlling the volume of the telephone ringer.

BRIEF DESCRIPTION OF THE DRAWINGS

The aformentioned objects and features of the invention, as well as other objects and features, will be better understood upon consideration of the following detailed description and appended claims made in conjunction with the attached drawings of an illustrative embodiment in which:

FIG. 1 is a block diagram illustrating the apparatus of the present invention;

FIG. 3A shows an apparatus using a pair of transistors to control the current from the telephone ringer to the signaling means. A lead L of the CPU is coupled to the base terminal of transistor Q1 for controlling the transistor Q1 in its high state enabling it to bring the transistor Q2 into a high state. FIG. 3B shows an embodiment which uses a plurality of transistors and resistors to limit the current outputted from the telephone ringer to the speaker for controlling the volume condition.

FIGS. 4A and 4B respectively represent two periods of time Selectively set for operation in accordance with the data stored in the ROM and RAM of the CPU.

DETAILED DESCRIPTION OF THE INVENTION

Figure 2A:
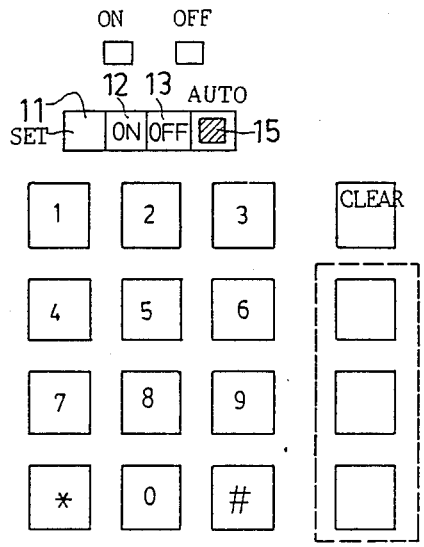
FIGS. 2A and 2B are perspective views showing the key assembly of the present invention, respectively.

Referring to FIG. 1, the apparatus comprises a key assembly 7 coupled to the CPU 8 via lead 54, a signaling means or controller 2 connected to the CPU 8 via lead 51, a speaker 3 coupled to the controller 2 via lead 55, a hook A connected to the controller 2, a dialing means 5 and a tone means 6 respectively coupled to the CPU 8 via leads 52 and 53, a pole means 4 connected to the dialing means 5, a speaker and a receiver respectively connected to the tone means 6, and a hook B connected to the CPU 8.

Preferred embodiments of this invention will now be described with reference to FIGS. 2 to 5.

Figure 2B:
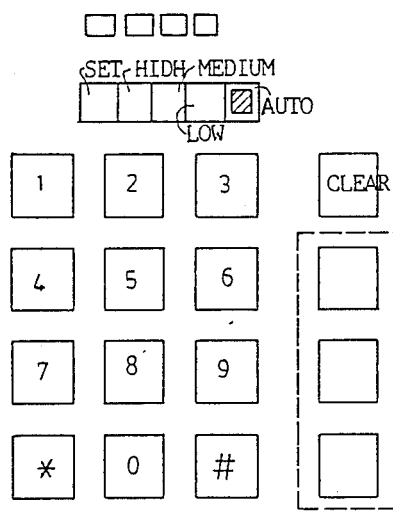

FIGS. 2A and 2B show the key assembly 7, respectively. The left-hand side of the key assembly 7 is provided with a numerical key pad, and a plurality of function keys is provided on the right-hand side. A plurality of selective buttons is provided adjacent to the numerical keys which contain pilot lights therewith as shown in FIGS. 2A and 2B.

The pilot lights provide a visual display as to which one of the selective buttons has been selected by a user.

Figure 3A:
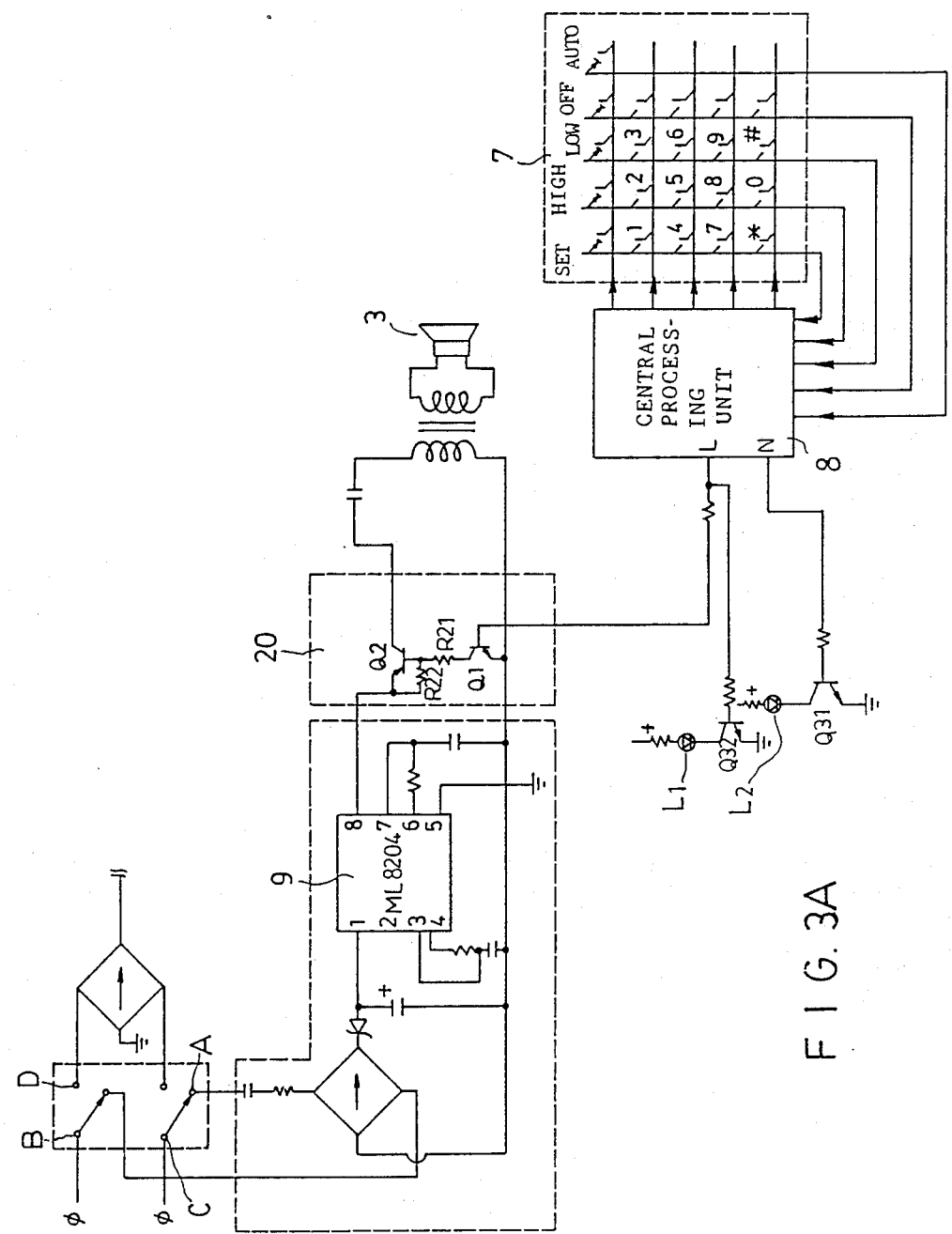
FIGS. 3A and 3B show two specific embodiments of the present invention wherein the telephone ringer is controlled by the data stored in the ROM and RAM of the CPU.
Figure 3B:
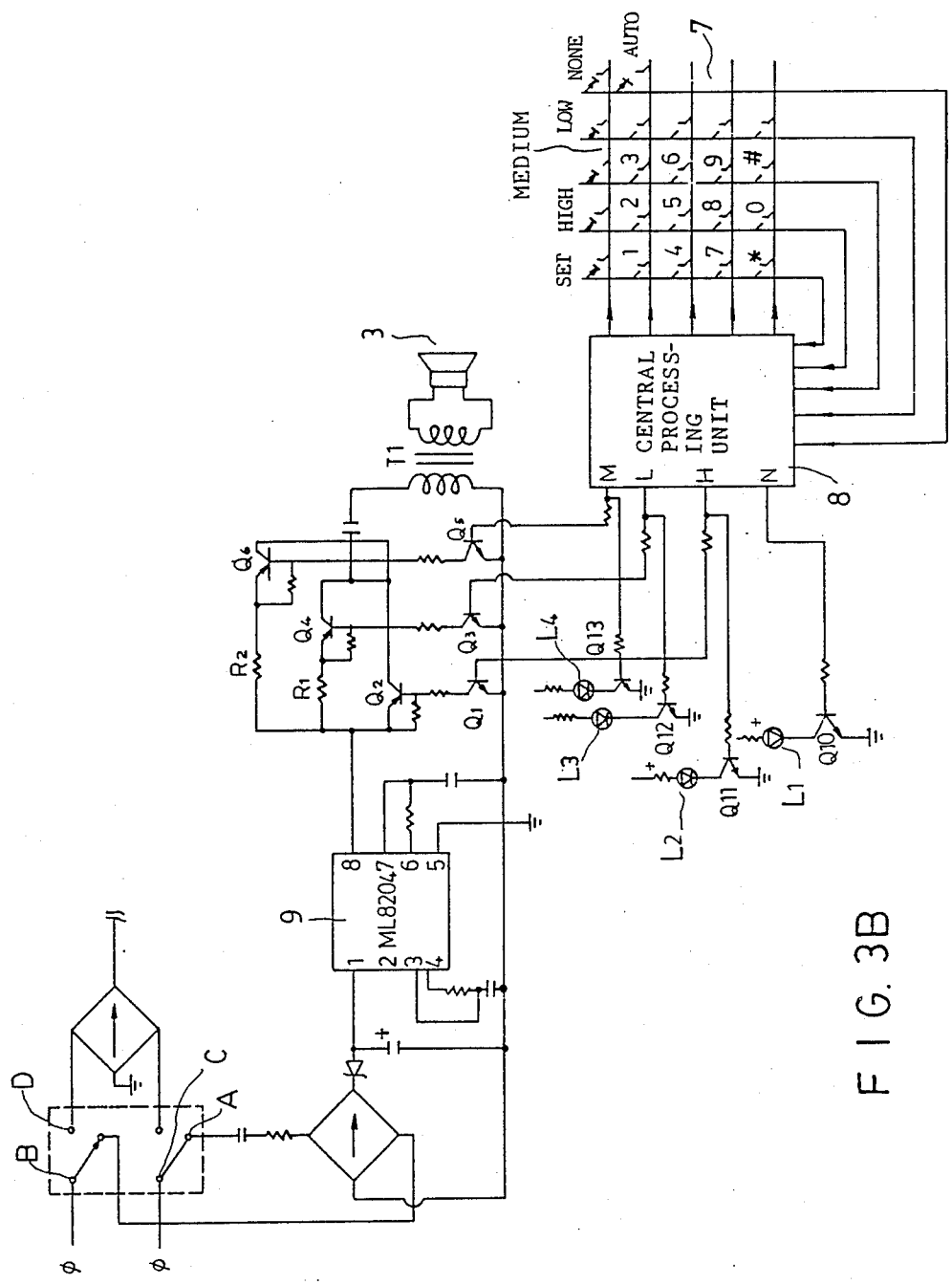

FIGS. 3A and 3B are schematic circuit diagrams illustrating the relationship between the CPU 8, telephone ringer 9 and key assembly 7 according to a first embodiment and a second embodiment of this invention, respectively.

FIG. 3A illustrates an apparatus according to a first embodiment of the invention. The key assembly 7 is connected to the CPU 8 for selecting the desired mode. Actions taken by the user with respect to the buttons produce signals which are coupled from key assembly 7 back to the CPU 8. These signals are further manipulated by the data stored in the ROM of the CPU (e.g., TC42C470 manufactured by TOSHIBA, JAPAN). After conditioning, the signals are fed to trigger the base terminal of transistors Q31 and Q32. With regard to transistor operation, signals coupled out of the CPU on leads N or L turn on transistors Q31 or Q32, the collector terminals of which are coupled to pilot lights L1 and L2, respectively. The circuitry of controller 20 includes a plurality of transistors and resistors. A transistor Q1 is connected in parallel with transistor Q32 to the CPU via lead L. The input signal on lead L to transistor Q1 provides on/off control for bringing the base terminal of the transistor Q2 up to a high state when the lead N is of the low state, thus turning transistor Q2 on. Consequently, the speaker 3 is activated.

FIG. 3B illustrates an apparatus according to this invention. The same reference numerals will be applied to the parts shared in common with the first embodiment of this invention and the descriptions of those parts will not be repeated. The parts of the apparatus according to the second embodiment of this invention will be described in detail when they are different from the parts of the first embodiment of this invention.

With particular regard to FIG. 3B, this figure shows a second embodiment of the present invention wherein a telephone ringer is programmed to be silent in conjunction with a plurality of transistors which are enabled or disenabled via operation of the CPU. The circuitry of controller 20 includes a plurality of transistors and resistors. The base terminals of transistors Q1, Q3 and Q5 are resepctively coupled to lead H, lead L and lead M, while each of the collector terminals thereof are coupled to the base terminal of transistors Q2, Q4 and Q6, respectively.

The base terminals of transistors Q11 and Q1 are connected in parallel with lead H of the CPU via resistor. The base terminal of transistor Q2 is connected to the collector terminal of transistor Q1 via resistor. The collector terminal of transistor Q2 is coupled to the transformer T1 via capacitor. The base terminals of transistors Q13 and Q3 are connected in parallel with lead L of the CPU via transistor. The base terminal of the transistor Q4 is coupled to the collector terminal of transistor Q3 via resistor, one terminal of resistor R1 is connected to the emitter terminal of transistor Q4, and the other terminal of which is coupled to the telephone ringer 9. The collector terminal of the transistor Q4 is coupled to the transformer T1 via capacitor. The base terminals of the transistors Q13 and Q5 are connected to the lead M of the CPU via resistor. The base terminal of the transistor Q6 is connected to the collector terminal of the transistor Q5 via resistor.

Resistor R2 coupled between the emitter terminal of transistor Q6 and the telphone ringer 9 is slightly lower than R1.

The collector terminal of transistor Q6 is connected to the transformer T1 via capacitor.

Resistors R1 and R2 provide a current limiting function to limit the amount of current coupled to the transformer T1.

As the signal outputted from lead H becomes a logic "1" and the other leads go into a low state, thus enabling the transistor Q11 to turn on the pilot light L2 and bring transistor Q2 up to a high state so that the current coming from the telephone ringer 9 is flowing through transistor Q2 and capacitor to transformer T1, thereby turning on the speaker 3.

Accordingly, when lead L goes into a high state, the transistors Q12 and Q3 are also turned on, thereby activating the pilot light L3 and transistor Q4. Thus, the current from lead 8 of the telephone ringer 9 flows through resistor R1 and transistor Q4 and capacitor to the transformer T1 wherein the resistor R1 functions as a limiter to activate the low volume condition for speaker 3.

Alternatively, when lead M is in a high state transistors Q13 and Q5 turn on, the current from the lead 8 of the telephone ringer 9 flows thorugh resistor R2 and transistor Q6 and capacitor to the transformer T1 wherein the resistor R2 functions as a limiter to activate the medium volume condition for the speaker 3.

Turning now to FIG. 4A, the first embodiment of this invention is shown wherein it includes a standard time setting and four predetermined time settings which can be stored in the RAM of the CPU 8. The standard time setting displays three functions: PM/AM, Hour and Minute. Each predetermined time setting displays four functions: the three functions as described above, and the fourth which denotes volume condition.

The format of the Hour and Minute both present two digits as normal. The format of the PM/AM presents one digit, wherein "0" indicates A.M., and "1" indicates P.M. In FIG. 4A, the format of volume condition presents one digit wherein "0" indicates the signaling volume is OFF, and "1" indicates that it is ON. In FIG. 4B, the format of volume presents two digits wherein "01" indicates the signaling volume is set at high, "10" indicates the signaling volume is set at low, "11" indicates the signaling volume is set at medium. The standard time is used to present the time by which predetermined time settings will operate. In the other words, the standard time setting functions as the basis from which the CPU 8 counts the time. The predetermined time settings serve to make the CPU 8 change the volume condition at the appropriate predetermined time.

In the setting operation, the function key "*" is first pressed by the user to represent that he is beginning to set the time and the volume condition, and then a digit from 0 to 4 is selected and keyed in to represent that the input corresponds to the standard time setting ("0") or the first to fourth predetermined time setting ("1 to 4", respectively). After the standard time setting or a predetermined time setting together with the desired function is keyed in, the function key "#" is depressed to end the setting operation. Two examples of key-in sequences are shown as follows:

(a). The input of the standard time setting:
"*"; "0"; "1"; "03"; "15"; "#".

(b). The input of the second predetermined time setting:
"*"; "2"; "0"; "06"; "30"; "01"; "#".

Moreover, a function key "clear", as shwon in FIGS. 2A and 2B, is provided for clearing the time set stored in the RAM of the CPU 8. A example of the clear operation is shown as follows:

(c). "*"; "4"; "clear"; "#".

Figure 5A:
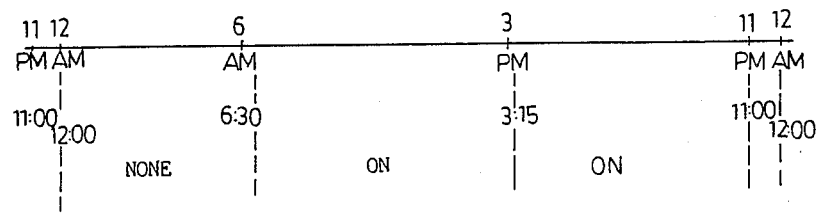
FIGS. 5A and 5B are schematic time diagrams showing time setting vs. volume condition in correspondence with the time charts illustrated in FIGS. 4A and 4B, respectively.
Figure 5B:
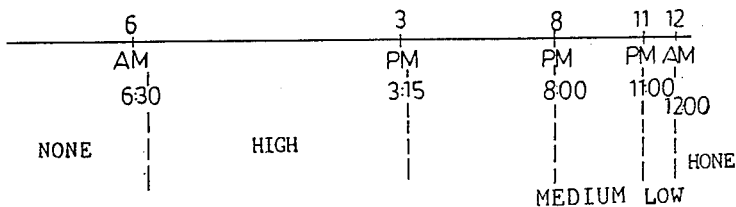

For a more precise understanding, view FIGS. 5A and 5B which show the time states vs. the volume condition together with the predetermined time settings as illustrated in FIGS. 4A and 4B, respectively. In FIG. 5A, the signaling volume condition is silenced from 11:00 P.M. to 6:30 A.M., and is operated from 6:30 A.M. to 11:00 P.M.. In FIG. 5B, the signaling volume condition is silenced from 12:00 A.M. to 6:30 A.M.. The signaling volume is on high from 6:30 A.M. to 8:00 P.M., and is on medium from 8:00 P.M. to 11:00 P.M.. From 11:00 P.M. to 12:00 A.M., the signaling volume is low. In these embodiments, normally, 12:00 A.M. represents midnight, and 12:00 P.M. represents noon. It should be understood that the above-mentioned predetermined time settings are not limited to four settings, but there must be at least two settings. If the telephone set has a clock, the standard time setting utilized as the basis for the CPU 8 to count the time can be removed. Although, in this invention, the CPU 8 enables the controller 20 to change the volume condition of the speaker, it should be note that those who are ordinarily skilled in the art can easily modify the signaling circuit to adjust the sound intensity, tone, sound frequency, etc., of the signaling means 3. Thus, the term "volume" should cover the broadest interpretation.

It should be understood that the above described embodiment is illustrative of but only a small number of many possible specific embodiments which can represent applications of the principles of this invention. With the invention thus explained, it is apparent that numerous other embodiments can readiy be devised in accordance with these principles by those skilled in the art without departing from the spirit and scope of the invention. It is therefore intended that the invention is limited only as included in the appended claims.

What is claimed is:

1. An apparatus for timely controlling a sound characteristic of a signaling means of a voice communication device having an input section for controlling the ringing volume condition of a telephone comprising:
   - a circuitry of controller coupled to the input section and the signaling means;
   - a setting means capable of generating at least two sets of time setting signals and sound characteristic setting signals;
   - a controlling means coupled to said setting means and said circuitry of controller for receiving and storing said sets of time setting signals and sound characteristic setting signals from said setting means, so that when a calling signal is transmitted to said circuitry of controller through said input section, said controlling means actuates said signalling means to produce a signaling sound having a desired sound characteristic, the desired sound characteristic of the signaling sound being predetermined by said sets of time setting signals and sound characteristic setting signals and sound characteristic setting signals stored in said controlling means;
   wherein said circuitry of controller comprises at least one set of transistors coupled to said input section, said controlling means, and said signalling means, said controlling means respectively controlling said transistors and turning one of said transistors on in accordance with said stored sets of time and sound characteristic setting signals, each of said transistors being connected with a respectively different resistance for attenuating said calling signal from said input section in different degrees, so that said signaling means will be actuated by an attenuated signal from said turned-on transistor to produce a signaling sound having the desired sound characteristic.

2. An apparatus as claimed in claim 1, wherein said setting means includes a key assembly having a plurality of keys provided for respectively setting the ringing volume condition.

3. An apparatus as claimed in claim 1, wherein said circuitry of controller comprises a pair of transistors electrically arranged for enabling and disenabling the signaling means.

4. An apparatus as claimed in claim 1, wherein said circuitry of controller comprises more than one pair of transistors electrically arranged to produce the sounding condition in different degree.

* * * * *